United States Patent [19]

Meyborg et al.

[11] 4,263,408
[45] Apr. 21, 1981

[54] PROCESS FOR THE PRODUCTION OF MOLDED FOAMS

[75] Inventors: Holger Meyborg, Odenthal; Werner Mormann, Leverkusen; Gerhard Grögler, Leverkusen; Jürgen Schwindt, Leverkusen, all of Fed. Rep. of Germany

[73] Assignee: Bayer Aktiengesellschaft, Leverkusen, Fed. Rep. of Germany

[21] Appl. No.: 57,935

[22] Filed: Jul. 16, 1979

[30] Foreign Application Priority Data

Jul. 22, 1978 [DE] Fed. Rep. of Germany ....... 2832253

[51] Int. Cl.³ .................... C08G 18/14; C08G 18/22
[52] U.S. Cl. ......................... 521/51; 260/45.8 N; 260/45.8 NT; 260/45.85 N; 260/45.85 R; 260/45.85 T; 428/315; 521/113; 521/114; 521/121; 521/125; 521/130; 521/133; 528/56; 528/57
[58] Field of Search .................... 521/51, 121, 125; 528/56, 57

[56] References Cited

U.S. PATENT DOCUMENTS

| | | | |
|---|---|---|---|
| 2,897,181 | 7/1959 | Windemuth | 528/56 |
| 3,108,975 | 10/1963 | Lambert et al. | 521/125 |
| 3,516,950 | 6/1970 | Haggis | 521/125 |
| 3,645,927 | 2/1972 | Andres et al. | 521/121 |
| 3,730,919 | 5/1973 | McGinn | 521/51 |
| 3,892,715 | 7/1975 | Bonin et al. | 260/77.5 AB |
| 3,925,527 | 12/1975 | Kleimann et al. | 521/51 |
| 3,945,981 | 3/1976 | Robertson | 260/77.5 AB |
| 3,975,317 | 8/1976 | Russo | 521/51 |
| 4,067,832 | 1/1978 | Des Marais | 260/2.5 AB |
| 4,101,471 | 7/1978 | Russo | 521/121 |

FOREIGN PATENT DOCUMENTS

| | | |
|---|---|---|
| 1064938 | 9/1959 | Fed. Rep. of Germany . |
| 1176358 | 8/1964 | Fed. Rep. of Germany . |
| 1196864 | 7/1965 | Fed. Rep. of Germany . |
| 1694138 | 2/1971 | Fed. Rep. of Germany . |
| 1559325 | 3/1969 | France . |
| 969114 | 9/1964 | United Kingdom . |
| 1694138 | 2/1971 | Fed. Rep. of Germany . |

*Primary Examiner*—H. S. Cockeram
*Attorney, Agent, or Firm*—Gene Harsh; Joseph C. Gil; Lyndanne M. Whalen

[57] ABSTRACT

The instant invention is directed to a process for the production of molded foams having a compact surface and cellular core and an integral density distribution over the cross-section of the body, comprising reacting (A) polyisocyanates, and
(B) relatively high molecular and/or low molecular compounds having an average of at least two isocyanate-reactive hydrogen atoms in the presence of:
(C) catalysts for the isocyanate polyaddition reaction and
(D) blowing agents and optionally other known additives, in a closed mold under the conditions of foaming inside molds, the improvement wherein said polyisocyanates are aliphatic and/or alicyclic polyisocyanates and said catalysts are catalyst combinations of:
 (i) an alkali metal and/or alkaline earth metal hydroxide and
 (ii) a metal compound, the metal compound being the acetylacetonate of iron, $C_1$-$C_8$ alcoholates, phenolates, enolates and/or acetylacetonates of metals of the 4th Main Group or sulfur compounds of metals of the 4th Main Group of the Periodic System of Elements in which the sulfur is directly attached to the metal atom.

11 Claims, No Drawings

PROCESS FOR THE PRODUCTION OF MOLDED FOAMS

BACKGROUND OF THE INVENTION

This invention relates to a process for the production of polyurethane foams which are resistant to weathering and virtually non-yellowing. The process according to the present invention is distinguished by the use of novel catalysts for the polyaddition reaction.

Foams based on polyisocyanates, e.g. polyurethane foams having a dense skin and cellular core such as are obtained by the method of foaming in molds (German Auslegeschriften Nos. 1,196,864 and 1,694,138 and French Pat. No. 1,559,325) are eminently suitable for the mass production of lightweight building constructions, e.g. for the furniture, motor vehicle or construction industry, or for the production of elastic molded articles such as cushions, shock absorbers or shoe soles. To produce the molded polyurethane articles, the foamable reaction mixture consisting of polyisocyanates, compounds carrying at least two isocyanate reactive hydrogen atoms and additives is introduced into a closed heatable mold in which it foams up and solidifies in a highly compressed state. The material exactly fills the mold and reproduces the internal surface of the mold.

The rigid and semi-rigid polyurethane foams hitherto brought on the market are mainly polyaddition products of aromatic polyisocyanates with polyether or polyester polyols. Although these products have superior mechanical properties which make them suitable for many of the applications mentioned above, they have the disadvantage of turning yellow as a result of weathering and, in addition, form a rough surface due to chemical degradation. If these known products are to be exposed to severe conditions in use, they must be covered with a protective layer of lacquer.

It is known that polyurethanes which are based on aliphatic or alicyclic isocyanates do not show this yellowing. Attempts, however, to produce molded polyurethane articles on the basis of aliphatic and alicyclic isocyanates have hitherto failed due to the problem of catalysis. It is not possible in the production of molded foams to obtain the typical structure of a compact skin and cellular core with the density gradually decreasing from the wall to the center of the foam by carrying out a subsequent heat treatment. It is therefore necessary to control the reaction by means of a suitable catalyst so that it begins after a short dwell time of the liquid mixture of starting components and is completed within a few seconds during which the material foams up and solidifies. Only in this way is it possible to ensure that the desired typical density gradient in the molded article is obtained as a result of the condensation of blowing agent on the walls of the mold and evaporation of the blowing agent in the interior of the mold.

It has now been found that excellent rigid and semi-rigid molded foams which undergo virtually no yellowing as a result of weathering and only very slight chemical degradation due to weathering can be produced by using aliphatic and/or alicyclic isocyanates as the polyisocyanate component together with amine-free catalyst combinations of alkali metal and/or alkaline earth metal hydroxide and certain organic metal catalysts.

DESCRIPTION OF THE INVENTION

The present invention therefore relates to a process for the production of molded foams which have a non-cellular surface and cellular core and an integral distribution of density over the cross-section of the body comprising reacting (A) polyisocyanates and (B) relatively high molecular and/or low molecular compounds having an average of at least two isocyanate-reactive hydrogen atoms in the presence of:

(C) catalysts for the isocyanate polyaddition reaction and (D) blowing agents and optionally other known additives inside a closed mold under the conditions of closed foam molding, the improvement wherein said polyisocyanates are aliphatic and/or alicyclic polyisocyanates and said catalysts are catalyst combinations of:

(i) in alkali metal and/or alkaline earth metal hydroxide, in particular lithium, sodium, potassium, magnesium and/or calcium hydroxide and (ii) a metal compound selected from the acetylacetonate of iron, $C_1$-$C_8$ alcoholates, phenolates, enolates and-/or acetylacetonates of metals of the 4th Main Group or sulfur-containing compounds of metals of the 4th Main Group of the Periodic System of Elements, in which sulfur is directly attached to the metal atom and in which the organic groups are preferably at least partly linked to the metal atom through sulfur atoms.

Suitable for the purpose of the present invention are those metal compounds which are compatible with alkali metal hydroxides and/or alkaline earth metal hydroxides, i.e. which retain their catalytic activity unchanged during the polyaddition reaction and are not hydrolyzed to any significant extent by the powerful basic hydroxides under the reaction conditions. Examples of such compounds include the acetylacetonates of Fe, Sn and Pb, e.g. dibutyl tin (IV) diacetylacetonate, phenolates, enolates and $C_1$-$C_8$ alcoholates of Sn(IV) and Pb. The Sn(II)— and Sn(IV) carboxylates commonly used in polyurethane chemistry, such as Sn(II) octoate or dibutyl tin dilaurate, on the other hand, are not suitable for the process according to the present invention.

Preferably, the metal compounds containing sulfur are of the formulae:

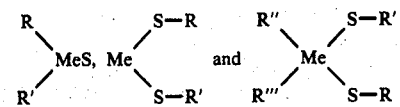

wherein

Me represents tin or lead, preferably tin, and

R, R', R" and R'" are the same or different and represent a straight or branched chain alkyl group having from 1 to 20 carbon atoms, preferably from 4 to 12 carbon atoms or a cycloalkyl group having from 6 to 15 carbon atoms optionally substituted by $C_1$-$C_4$ alkyl groups or a phenyl group optionally substituted with an alkyl group having 1 to 6 carbon atoms.

Compounds corresponding to the following general formula:

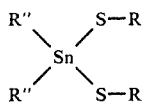

wherein
R represents a straight or branched chain alkyl group having from 8 to 12 carbon atoms and
R" represents a straight or branched chain alkyl group having from 4 to 8 carbon atoms are particularly preferred.

The following are examples of suitable sulfur-containing catalysts: dibutyl tin (IV) sulfide, dioctyl tin (IV) sulfide, dibutyl tin (IV)-bis-dodecylmercaptide, dioctyl tin (IV) -bis-dodecylmercaptide and tin (II)-bis-(2-ethylhexyl mercaptide). According to the present invention, it is particularly preferred to use dibutyl tin (IV)-bis-dodecylmercaptide.

Suitable alkali metal and alkaline earth metal hydroxides according to the present invention are the hydroxides of Li, Na, K, Rb, Cs, Mg, Ca, Sr and/or Ba. Na, K and Ca hydroxide are preferred. Potassium hydroxide is particularly preferred on account of its solubility in polyols.

The catalyst combinations according to the present invention are normally used in quantities of from 0.005 to 4% by weight, preferably from 0.1 to 1.0% by weight, based on the polyurethane reaction mixture. The molar ratio of alkali metal and/or alkaline earth metal hydroxide to organometallic compound is in the range of from 6:1 to 1:6, preferably from 3:1 to 1:3. The alkali metal and/or alkaline earth metal hydroxide is preferably in the form of a 1 to 40%, more particularly a 5 to 15% solution in a low molecular weight alcohol. The catalyst combinations may be added to the reaction mixture either separately as individual components or as a mixture of components.

As is well known, foams can be produced by the polymerization of polyisocyanates alone or by the polyaddition reaction of polyisocyanates with compounds which have an average of at least two Zerewitinoff-active hydrogen atoms to produce, for example, polycarbodiimide, polyisocyanurate, polyurea, polybiuret, polyamide, polyallophanate or polyurethane foams or mixed types or other polyisocyanate based foams. The present process is particularly suitable for the production of foams which have polyurethane groups.

The polyisocyanates used as starting components A) according to the present invention may be aliphatic, cycloaliphatic or heterocyclic polyisocyanates such as those described, for example, by W. Siefken in Justus Liebigs Annalen der Chemie, 562, pages 75 to 136, for example, ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethylcyclohexane (German Auslegeschrift No. 1,202,785), hexahydrotolylene-2, 4-diisocyanate and -2,6-diisocyanate and any mixtures of these isomers, hexahydrophenylene-1,3-diisocyanate and/or 1,4-diisocyanate, perhydrodiphenylmethane-2,4'-diisocyanate and/or 4,4'-diisocyanate and any known diisocyanates or polyisocyanates which are based on the above-mentioned monomeric isocyanates and contain carbodiimide groups, allophanate groups, isocyanurate groups, urethane groups, acylated urea groups, biuret groups, uretdione groups, ester groups, ether groups, thioether groups and/or thioester groups. Prepolymers containing isocyanate groups and obtained from the above-mentioned isocyanates and compounds containing Zerewitinoff-active hydrogen atoms (in particular polyesters, polyethers, polyester polyethers, polythioethers, polythioesters and/or polythioether polythioesters) or mixtures of isocyanate prepolymers with the monomeric isocyanates (so-called semi-prepolymers) may also be used according to the present invention. Any mixtures of the above-mentioned polyisocyanates are also suitable.

The starting components B) used for the production of foams according to the present invention are compounds which carry at least two isocyanate-reactive hydrogen atoms and generally have a number average molecular weight of from 400 to 10,000 as determined by gel permeation chromatography. These may be compounds containing amino groups, thiol groups or carboxyl groups but are preferably compounds containing hydroxyl groups. Particularly preferred are compounds containing from 2 to 8 hydroxyl groups, especially those having a molecular weight of from 800 to 10,000, preferably from 1000 to 6000, e.g. polyesters, polyethers, polythioethers, polyacetals, polycarbonates and polyester amides having at least 2, generally from 2 to 8, preferably from 2 to 4 hydroxyl groups, such as the compounds known to be used for the production of homogeneous and cellular polyurethanes. They include the following:

(a) Suitable polyesters having hydroxyl groups include e.g. the reaction products of polyhydric alcohols and polybasic acids. The preferred polyhydric alcohols are dihydric optionally admixed with trihydric alcohols and the preferred polybasic acids are dibasic carboxylic. Instead of free polycarboxylic acids, the corresponding polycarboxylic acid anhydrides or corresponding polycarboxylic acid esters of lower alcohols or mixtures thereof may be used for the preparation of the polyesters. The polycarboxylic acids may be aliphatic, cycloaliphatic, aromatic and/or heterocyclic. They may be substituted, e.g. with halogen atoms, and/or unsaturated.

The following are examples of such carboxylic acids and their derivatives: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids optionally mixed with monomeric fatty acids, such as oleic acid; dimethylterephthalate and terephthalic acid-bis-glycol esters. The following examples of suitable polyhydric alcohols: ethylene glycol, propylene glycol-(1,2) and -(1,3), butylene glycol-(1,4) and -(2,3), hexanediol-(1,6), octanediol-(1,8), neopentylglycol, 1,4-bishydroxymethylcyclohexane, 2-methyl-1,3-propanediol, glycerol, trimethylolpropane, hexanetriol-(1,2,6), butanetriol-(1,2,4), trimethylolethane, pentaerythritol, quinitol, mannitol, sorbitol, formitol, methylglycoside, diethylene glycol, triethylene glycol, tetraethylene glycol and higher polyethylene glycols, dipropylene glycol and higher polypropylene glycols and dibutylene glycol and higher polybutylene glycols. The polyesters may also contain a proportion of carboxyl end groups. Polyesters of lactones such as ε-caprolactone or of hydroxycarboxylic acids such as ω-hydroxycaproic acid may also be used.

(b) The polyethers used according to the present invention which have at least 2, generally from 2 to 8 and preferably 2 or 3 hydroxyl groups are also known per se. They are prepared, for example, by polymerization of epoxides such as ethylene oxide, propylene oxide, butylene oxide, tetrahydrofuran, styrene oxide or epichlorohydrin. They may be polymerized either each on its own, e.g. in the presence of Lewis catalysts such as $BF_3$, or by addition of these epoxides, preferably ethylene oxide or propylene oxide, optionally as mixtures or successively, to starting components having reactive hydrogen atoms. Examples of components having reactive hydrogen atoms include water, alcohols, ammonia or amines. Specific examples include ethylene glycol, propylene glycol-(1,3) or -(1,2), trimethylolpropane, glycerol, sorbitol, 4,4'-dihydroxydiphenylpropane, aniline, ethanolamine and ethylene diamine. Sucrose polyethers may also be used according to the invention (German Auslegeschriften No. 1,176,358 and 1,064,938). Polyethers started on formitol or formose may also be used according to the present invention (German Offenlegungsschriften No. 2,639,083 and 2,737,951). It is in many cases preferred to use polyethers which contain predominantly primary OH groups (up to 90% by weight, based on all the OH groups present in the polyether). Polybutadienes which have OH groups are also suitable for the process of the present invention.

(c) Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythioether esters or polythio ether ester amides, depending on the co-components.

(d) Suitable polyacetals include, for example, the compounds which can be prepared from glycols such as diethylene glycol, triethylene glycol, 4,4'-dioxethoxydiphenyl dimethylmethane, hexanediol and formaldehyde. Suitable polyacetals for the purpose of the present invention may also be prepared by the polymerization of cyclic acetals such as trioxane (German Offenlegungsschrift No. 1,694,128).

(e) The polycarbonates having hydroxyl groups used may be of the kind known per se. Examples include those which can be prepared by the reaction of diols such as propane-(1,3), butanediol-(1,4) and/or hexanediol-(1,6), diethylene gylcol, triethylene glycol, tetraethylene glycol or thiodiglycol with diarylcarbonates, e.g. with diphenylcarbonate or phosgene. (German Auslegeschriften No. 1,694,080; 1,915,908 and 2,221,751 and German Offenlegungsschrift No. 2,605,024).

(f) Suitable polyester amides and polyamides include, for example, the predominantly linear condensates prepared from polyvalent saturated or unsaturated carboxylic acids or their anhydrides and polyvalent saturated or unsaturated amino alcohols, diamines, polyamines and mixtures thereof.

(g) Polyhydroxyl compounds already containing urethane or urea groups and modified or unmodified natural polyols such as castor oil, carbohydrates or starch may also be used. Addition products of alkylene oxides and phenol formaldehyde resins or of alkylene oxides and urea formaldehyde resins are also suitable for the purpose of the present invention.

(h) The polyhydroxyl compounds mentioned may also be modified in various ways before they are used in the polyisocyanate polyaddition process. According to German Offenlegungsschriften No. 2,210,839(U.S. Pat. No. 3,849,515) and 2,544,195, a mixture of various polyhydroxyl compounds (e.g. of a polyether polyol and a polyester polyol) can be condensed by etherification in the presence of a strong acid to a higher molecular weight polyol which is built up of various segments linked by ether bridges.

(i) Polyhydroxyl compounds containing high molecular polyadducts or polycondensates or polymers in a finely dispersed or dissolved form may also be used according to the present invention. Such polyhydroxyl compounds are obtained, for example, when polyaddition reactions, (e.g. reactions between polyisocyanates and amino-functional compounds) or polycondensation reactions (e.g. reactions between formaldehyde and phenols and/or amines) are carried out in situ in the above-mentioned hydroxyl compounds. Processes of this kind have been described in German Auslegeschriften No. 1,168,075 and 1,260,142 and in German Offenlegungsschriften Nos. 2,324,134; 2,423,984; 2,512,385; 2,513,815; 2,550,796; 2,550,797; 2,550,833; 2,550,862; 2,633,293 and 2,639,254. Polyhydroxyl compounds of this type can also be obtained according to U.S. Pat. No. 3,869,413 or German Offenlegungsschrift No. 2,550,860 by mixing a previously prepared aqueous polymer dispersion with a polyhydroxyl compound and then removing the water from the mixture.

Polyhydroxyl compounds which are modified with vinyl polymers, e.g. the compounds obtained by the polymerization of styrene and acrylonitrile in the presence of polyethers (U.S. Pat. Nos. 3,383,351; 3,304,273; 3,523,093 and 3,110,695 and German Auslegeschrift No. 1,152,536) or of polycarbonate polyols (German Patent No. 1,769,795 and U.S. Pat. No. 3,637,909) are also suitable for the process according to the present invention. Polyethers which have been modified in accordance with German Offenlegungsschriften Nos. 2,442,101; 2,644,922 and 2,646,141 by graft polymerization with vinyl phosphonic acid esters and optionally (meth) acrylonitrile, (meth)acrylamide or OH functional (meth) acrylic acid esters give rise to synthetic materials having exceptionally high flame resistance. Polyhydroxyl compounds into which carboxyl groups have been introduced by radical graft polymerization with unsaturated carboxylic acids and optionally other olefinically unsaturated monomers (German Offenlegungsschriften Nos. 2,714,291; 2,739,620 and 2,654,746) are particularly advantageous to use in combination with mineral fillers.

When modified polyhydroxyl compounds of the type indicated above are used as starting components in the polyisocyanate polyaddition process, they frequently give rise to polyurethanes which have substantially improved mechanical properties.

Representatives of the above-mentioned compounds to be used according to the present invention have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, Carl-Hanser-Verlag, Munich, 1966, e.g. on pages 45–71.

Mixtures of the above-mentioned compounds which contain at least two isocyanate-reactive hydrogen atoms and have a molecular weight of from 400 to 10,000 may be used, e.g. mixtures of polyethers and polyesters. If such mixtures are to be used, it is in some cases particularly advantageous to combine low melting and high melting polyhydroxyl compounds (German Offenlegungsschrift No. 2,706,297).

The starting components used according to the present invention may also include compounds having a molecular weight of from 32 to 400 which have at least two isocyanate-reactive hydrogen atoms. These are compounds containing hydroxyl groups and/or amino groups and/or thiol groups and/or carboxyl groups, preferably hydroxyl groups and/or amino groups. They serve as chain lengthening agents or cross-linking agents. They generally have from 2 to 8, and preferably from 2 to 4 isocyanate-reactive hydrogen atoms.

These compounds which have a molecular weight of from 32 to 400 and contain at least two isocyanate-reactive hydrogen atoms may also be used as mixtures of such compounds.

The following are given as examples of such compounds: ethylene glycol, propylene glycol-(1,2) and -(1,3), butylene glycol-(1,4) and -(2,3), pentanediol-(1,5), hexanediol-(1,6), octanediol-(1,8), neopentylglycol, 1,4-bis-hydroxymethyl-cyclohexane, 2-methyl-1,3-propanediol, dibromobutenediol (U.S. Pat. No. 3,723,392), glycerol, trimethylolpropane, hexanetriol-(1,2,6), trimethylolethane, pentaerythritol, quinitol, mannitol, sorbitol, castor oil, diethylene glycol, triethylene glycol, tetraethyleneglycol, higher polyethylene glycols having a molecular weight of up to 400, dipropylene glycol, higher polypropylene glycols having a molecular weight of up to 400, dibutylene glycol, higher polybutylene glycols having a molecular weight of up to 400, 4,4'-dihydroxy-diphenylpropane, dihydroxymethyl-hydroquinone, ethanolamine, diethanolamine, N-methyl-diethanolamine, triethanolamine and 3-aminopropanol.

The low molecular polyols used according to the present invention may also be mixtures of hydroxyaldehydes and hydroxyketones ("formose") or the polyhydric alcohols obtained from them by reduction ("formitol") such as the products obtained from the autocondensation of formaldehyde hydrate in the presence of metal compounds as catalysts and of compounds capable of enediol formation as co-catalysts (German Offenlegungsschriften No. 2,639,084; 2,714,084, 2,714,104; 2,721,186; 2,738,154 and 2,738,512). It is advantageous to use these formoses in combination with aminoplast formers and/or phosphites (German Offenlegungsschriften Nos. 2,738,513 and 2,738,532) in order to obtain synthetic materials having improved flame resistance. Solutions of polyisocyanate polyaddition products, in particular of polyurethane ureas which have ionic groups and/or of polyhydrazo-dicarbonamides, in low molecular polyhydric alcohols may also be used as polyol components according to the present invention (German Offenlegungsschrift No. 2,638,759). The preferred NCO:OH range is from 0.7:1 to 1.3:1.

Water and/or readily volatile inorganic or organic substances may also be used as blowing agents according to the present invention. Suitable organic blowing agents include e.g. acetone, ethyl acetate, halogen substituted alkanes such as methylene chloride, chloroform, ethylidene chloride, vinylidene chloride, monofluorotrichlormethane, chlorodifluoromethane or dichlorodifluoromethane and butane, hexane, heptane and diethylethers. Air, $CO_2$ and $N_2O$ are examples of inorganic blowing agents. The effect of a blowing agent may also be obtained by the addition of compounds which decompose at temperatures above room temperature to liberate gases such as nitrogen, e.g. azo compounds such as azodicarbonamide or azoisobutyric acid nitrile. Further examples of blowing agents and details concerning the use of blowing agents may be found in KunststoffHandbuch, Volume VII, published by Vieweg and Höchtlen, Carl-Hanser-Verlag, Munich, 1966, e.g. on pages 108 and 109, 453–455 and 507–510.

In the process according to the present invention it is also advantageous to add light stabilizers. The following light stabilizers may be used:

I. Piperidine derivatives

4-Benzoyloxy-, 4-salicyloyloxy-, 4-caryloyloxy-, 4-stearoyloxy-, 4-(β-3,4-di-tert.-butyl-4-hydroxyphenyl-propionyloxy)- and 4-(3,5-di-tert.-butyl-4-hydroxybenzoyloxy)-2,2,6,6-tetramethyl-piperidine; 4-benzoyloxy-, 4-salicyloyloxy-, 4-stearoyloxy- and 4-tert.-butylphenoyloxy-1,2,2,6,6-pentamethyl-piperidine; bis-(2,2,6,6-tetramethyl-4-piperidyl)-sebacate, bis- (2,2,6,6-tetramethyl-4-piperidyl)-suberate, bis-(2,2,6,6-tetramethyl-4-piperidyl)-dodecane dioate, bis-(1,2,2,6,6-pentamethyl-4-piperidyl)-sebacate; 4-caryloyloxy-1-propyl-2,2,6,6-tetramethylpiperidine; 4-caryloyloxy-1-allyl-2,2,6,6-tetramethyl-piperidine; 4-benzoylamido-, 4-acryloylamido- and 4-stearoylamido-2,2,6,6-tetramethyl-piperidine; 2,4,6-tris-(2,2,6,6-tetramethyl-4-piperidyloxy)-s-triazine, 2,4,6-tris-(1,2,2,6,6-pentamethyl-4-piperidyloxy)-s-triazine, 2,4,6-tris-(2,2,6,6-tetramethyl-4-piperidylamino)-s-triazine, 2,2,6,6-tetramethyl-4-β-cyanoethoxy-piperidine, 1,2,2,6,6-pentamethyl-4-lauroyloxy-piperidine and triacetone aminoxime.

II. Benzophenone derivatives 2,4-dihydroxy-, 2-hydroxy-4-methoxy-, 2-hydroxy-4-octoxy-, 2-hydroxy-4-dodecyloxy-, 2-hydroxy-4-benzyloxy-, 2-hydroxyl-4,4'-dimethoxy-, 2,4,4'-trihydroxy, 2,2'-dihydroxy-4,4'-dimethoxy, 2,2'4,4'-tetrahydroxy-, 2,2'-dihydroxy-4-methoxy-, 2-hydroxy-2'-carboxy-4-methoxy-, 2,2'-dihydroxy-4-oxtoxy- and 2,2'-dihydroxy-4-dodecyloxy-benzophenone.

III. Benzotriazole derivatives 2-(2'-hydroxy-5'-methylphenyl)-, 2-(2'-hydroxy-5'-tert.- butylphenyl)-, 2-(2'-hydroxy-5'-tert. octylphenyl)-, 2-(2'-hydroxy-3'-tert.-butyl-5'-methylphenyl)-, 2-(2'-hydroxy-3'-tert.-butyl-5'-methylphenyl)-5-chloro-, 2-(2'-hydroxy-3',5'-di-tert.-butylphenyl)-, 2-(2'-hydroxy-3',5'-di-tert.-butylphenyl)-5-chloro, 2-(2'-hydroxy-3',5'-di-tert.-amylphenyl)-, 2-(2'-hydroxy-3',5'-di-tert.-amylphenyl)-5-chloro-, 2,(2'-hydroxy-3'-sec.-butyl-5'-tert.-butylphenyl)-, 2-(2'-hydroxy-3'-tert.-butyl-5'-sec.-butylphenyl)-, 2-(2',4'-dihydroxyphenyl)-, 2-(2'-hydroxy-4'-methoxyphenyl)-, 2-(2'-hydroxy-4'-octoxy-phenyl)-, 2-(2'-hydroxy-3'-α-phenylethyl-5'-methyl-phenyl)- and 2-(2'-hydroxy-3'-α-phenylethyl-5'-methyl-phenyl)-5-chlorobenzotriazole.

IV. Oxalanilides 2-ethyl-2'-ethoxy-, 2-ethyl-2'-ethoxy-5'-tert.-butyl-, 2-ethyl-4-tert.-butyl-2'-ethoxy-5'-tert.-butyl-, 2,2'-dimethoxy-, 2,2'-diethoxy-, 2-methoxy-2'-ethoxy-, 2-methoxy-4'-ethoxy-, 2-ethoxy-4'-methoxy-, 2,2'-dioctoxy-5,5'-di-tert.-butyl-, 2,2'-didodecyloxy-5,5'-di-tert.- butyl-, 2-ethoxy-2'-octoxy-4,4'-di-octoxy-, 2-ethyl-2'-butoxy- and 4-methyl-4'-methoxyoxalanilide.

V. Salicylic acid phenyl esters and derivatives

Salicylic acid phenyl ester, salicylic acid-4-tert.-butylphenylester and salicylic acid-4-tert.-octylphenyl ester.

VI. Cinnamic acid ester derivatives

α-cyano-β-methyl-4-methoxy-cinnamic acid methyl ester,
α-cyano-β-methyl-4-methoxy-cinnamic acid butyl ester,
α-cyano-β-phenyl-cinnamic acid ethyl ester and
α-cyano-β-phenyl-cinnamic acid isooctyl ester.

VII. Malonic ester derivatives 4-methoxy-benzylidene-malonic acid dimethyl ester,
4-methoxy-benzylidene-malonic acid diethyl ester,
4-butoxy-benzylidene-malonic acid diethyl ester.

According to the present invention, the abovementioned light stabilizers are preferably used individually but they may also be used in any combination. Piperidine derivatives are particularly preferred.

Surface-active additives (emulsifiers and foam stabilizers) may also be used according to the present invention. Suitable emulsifiers include e.g. the sodium salts of ricinoleic sulfonates or of fatty acids or salts of fatty acids with amines, such as oleic acid diethylamine or stearic acid diethanolamine. Alkali metal and ammonium salts of sulfonic acids, e.g. of dodecylbenzene sulfonic acid or of dinaphthylmethane disulfonic acid, or of fatty acids such as ricinoleic acid or of polymeric fatty acids may also be used as surface-active additives, as well as ethoxylated nonylphenol.

Suitable foam stabilizers are particularly the polyether siloxanes, especially those which are water-soluble. These compounds generally have a polydimethylsiloxane group attached to a copolymer of ethylene oxide and propylene oxide. Foam stabilizers of this type have been described in U.S. Pat. Nos. 2,834,748; 2,917,480 and 3,629,308. It is particularly interesting in many cases to use polysiloxane-polyoxyalkylene copolymers which are branched through allophanate groups (German Offenlegungsschrift No. 2,558,523).

The above-mentioned emulsifiers and stabilizers are preferably used singly according to the present invention, but may also be used in any combination. Ethoxylated nonylphenols are particularly preferred, especially a nonylphenol having about 6 ethylene oxide units.

Reaction retarders, e.g. compounds which are acid in reaction, such as hydrochloric acid, sulfuric acid, phosphoric acid or organic acid halides may be used. Known cell regulators such as paraffins or fatty alcohols or dimethylpolysiloxanes, pigments, dyes, known flame retarding agents such as tris-chloroethylphosphate, tricresylphosphate and ammonium phosphate and polyphosphate, stabilizers against ageing and weathering, plasticizers, fungistatic and bacteriostatic substances may be used. Fillers such as barium sulfate, kieselguhr, carbon black or whiting, may also be used according to the present invention.

Other examples of surface-active additives, foam stabilizers, cell regulators, reaction retarders, stabilizers, flame retarding substances, plasticizers, dyes, fillers and fungistatic and bacteriostatic substances optionally used according to the present invention and details concerning their use and mode of action may be found in Kunststoff-Handbuch, Volume VII, published by Vieweg and Höchtlen, Carl-Hanser-Verlag, Munich, 1966, e.g. on pages 103 to 113.

A method for carrying out the process according to the present invention is given below.

According to the invention, the starting components are reacted together by the known one-shot process, prepolymer process or semi-prepolymer process, in many cases using mechanical devices such as those described in U.S. Pat. No. 2,764,565. Details concerning processing apparatus suitable for the process according to the invention may also be found in Kunststoff-Handbuch, Volume VII, published by Vieweg and Höchtlen, Carl-Hanser-Verlag, Munich, 1966, e.g. on pages 121 to 205.

The production of foams according to the present invention is carried out in closed molds.

The material used for the molds may be a metal, e.g. aluminum, or a synthetic material, e.g. an epoxide resin. The reaction mixture foams up inside the mold to form the shaped product. Foaming inside molds may be carried out to produce a product having a cellular surface or it may be carried out to produce a product having a non-cellular skin and a cellular core. According to the present invention, the desired result may be achieved on the one hand by introducing just sufficient reaction mixture into the mold to fill the mold with foam after the reaction. On the other hand, a larger quantity of reaction mixture than is necessary to fill the interior of the mold with foam may be introduced. The latter method is known as "overcharging", (U.S. Pat. Nos. 3,178,490 and 3,182,104).

The process of foaming inside molds is frequently carried out with the aid of known "external mold release agents" such as silicone oils. So-called "internal mold release agents" (German Offenlegungsschriften Nos. 2,121,670 and 2,307,589) may also be used, optionally in combination with external mold release agents.

Cold setting foams may also be produced according to the invention (British Pat. No. 1,162,517, German Offenlegungsschrift No. 2,153,086). The products of the process may be obtained as rigid products for the manufacture of furniture parts, car body parts, technical apparatus and structural elements or as semi-rigid to soft products for the production of safety cushioning in the construction of motor vehicles, elastic shoe soles, shock absorbers, etc.

The process according to the present invention is described below by way of example. The parts given are parts by weight unless otherwise indicated. The percentages represent percentages by weight.

EXAMPLES

Example 1

100 parts of a polyol mixture having an OH number of 588 and a viscosity at 25° C. of 4300 MPa.s, consisting of 35 parts of a polyether having an OH number of 36 which has been obtained by the addition of propylene oxide and ethylene oxide to trimethylolpropane and 65 parts of a polyether having an OH number of 900 which has been obtained by the addition of propylene oxide to trimethylolpropane, 3 parts of ethoxylated nonylphenol as stabilizer, 0.12 parts of KOH,
0.6 parts of dibutyl tin(IV)-bis-(dodecylmercaptide),
10 parts of monofluorotrichloromethane and 182 parts of an aliphatic polyisocyanate having an isocyanate content of 28.9% and a viscosity of 900 mPa.s, prepared by the prepolymerization of isophorone diisocyanate with the abovementioned addition product of propylene oxide and trimethylolpropane (OH number 900) are mixed together and introduced into a closed metal mold maintained at 70° C. The product is removed from the mold after 5 minutes. It can easily be released from the mold and has an overall gross density of 0.6 g/cm³ and a completely covering non-cellular skin.

The rise and gel time are determined on a portion of the reaction mixture which is poured into an open mold. The rise time is 33 seconds, the gel time 55 seconds.

EXAMPLE 2

The procedure is similar to that described in Example 1, with the sole difference that 0.12 parts of NaOH are used instead of 0.12 parts of KOH. The rise time is 32 seconds, the gel time 46 seconds. The material can easily be released from its mold.

EXAMPLE 3

The procedure is similar to that described in Example 1, but 0.4 parts of dibutyl tin (IV) diacetylacetonate are used instead of dibutyl tin (IV)-bis-(dodecyl mercaptide). The rise time is 48 seconds and the gel time 69 seconds. The material can easily be released from its mold.

EXAMPLE 4 (Comparison)

Example 1 is repeated but with the difference that 0.6 parts of dibutyl tin (IV)-dilaurate are used instead of 0.6 parts of dibutyl tin (IV)-bis-(dodecyl mercaptide). The rise time is 105 seconds and the gel time is 120 seconds. The material is removed from its mold with difficulty and is tacky on the surface.

EXAMPLE 5 (Comparison)

0.4 parts of tin (II) octoate are used instead of the 0.6 parts of mercaptide used in Example 1. The rise time is 22 seconds and the gel time is 110 seconds. The material is removed from the mold with difficulty and has a brittle surface layer.

What is claimed is:

1. In a process for the production of molded foams having a compact surface and cellular core and an integral density distribution over the cross-section of the body, comprising reacting
   (A) polyisocyanates, and
   (B) relatively high molecular and/or low molecular compounds having an average of at least two isocyanate-reactive hydrogen atoms in the presence of:
   (C) a catalytic amount of a catalyst for the isocyanate polyaddition reaction and
   (D) blowing agents and optionally other known additives, in a closed mold under the conditions of foaming inside mold, the improvement wherein said polyisocyanates are aliphatic and/or alicyclic polyisocyanates and said catalyst is a catalyst combination of:
   (i) an alkali metal and/or alkaline earth metal hydroxide and
   (ii) a sulfur compound of the formula

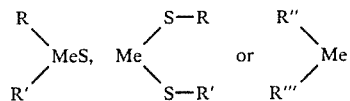

or mixtures thereof wherein
Me represents tin or lead and
R, R', R" and R''', which may be the same or different, represent a straight or branched chain alkyl group having from 1 to 20 carbon atoms or a cycloalkyl group having from 6 to 15 carbon atoms optionally substituted by $C_1$-$C_4$ alkyl groups or a phenyl group optionally substituted by $C_1$-$C_6$ alkyl groups.

2. The process of claim 1, wherein said compounds used as component (ii) are organotin compounds.

3. The process of claim 2, wherein said component (ii) are compounds of the formula:

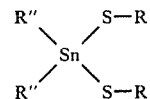

wherein
R represents a straight or branched chain alkyl group having from 8 to 12 carbon atoms and
R" represents a straight or branched chain alkyl group having from 4 to 8 carbon atoms.

4. The process of claim 1, wherein said catalyst combination is a combination of potassium hydroxide and dibutyl tin (IV)-bis-dodecyl mercaptide.

5. The process of claim 1, wherein said alkali metal and/or alkaline earth metal hydroxide is selected from the group consisting of lithium hydroxide, sodium hydroxide, potassium hydroxide, magnesium hydroxide, calcium hydroxide, or mixtures thereof.

6. The process of claim 1, wherein said catalyst combinations are used in a quantity of from 0.05 to 4% by weight, based on the polyurethane solid content.

7. The process of claim 6, wherein said quantity is from 0.1 to 1%.

8. The process of claim 1, wherein the molar ratio of said alkali metal and/or alkaline earth metal hydroxide to organometallic compound is from 6:1 to 1:6.

9. The process of claim 8, wherein said molar ratio is from 3:1 to 1:3.

10. The process of claim 1, wherein said alkali metal and/or alkaline earth metal hydroxide is in the form of a 1 to 40% solution in a low molecular weight alcohol.

11. The process of claim 10, wherein said alkali metal and/or alkaline earth metal hydroxide is in a 5 to 15% solution.

* * * * *